United States Patent [19]

Dhyanchand et al.

[11] Patent Number: 4,862,342
[45] Date of Patent: Aug. 29, 1989

[54] DC TO AC INVERTER WITH NEUTRAL HAVING A RESONANT CIRCUIT

[75] Inventors: John J. Dhyanchand; Sampat F. Shekhawat; Vietson M. Nguyen, all of Rockford, Ill.

[73] Assignee: Sundstrand Corp., Rockford, Ill.

[21] Appl. No.: 128,444

[22] Filed: Dec. 3, 1987

[51] Int. Cl.$^4$ .................... H02M 7/538; H02M 1/12
[52] U.S. Cl. ........................................ 363/40; 363/132
[58] Field of Search ............... 363/37, 40, 131, 132, 363/163; 318/762, 803

[56] References Cited

U.S. PATENT DOCUMENTS

| | | | |
|---|---|---|---|
| 3,940,669 | 2/1976 | Tsuboi et al. | 363/137 |
| 4,128,868 | 12/1978 | Gamble | 363/26 |
| 4,138,715 | 2/1979 | Miller | 363/28 |
| 4,196,469 | 4/1980 | Gurwicz | 363/131 |
| 4,276,586 | 6/1981 | Boekhorst | 363/21 |
| 4,413,313 | 11/1983 | Robinson | 363/80 |
| 4,443,839 | 4/1984 | Onodera et al. | 363/20 |
| 4,449,174 | 5/1984 | Ziesse | 363/21 |
| 4,502,106 | 2/1985 | Glennon | 363/132 |
| 4,551,635 | 11/1985 | Kuroki | 307/254 |
| 4,564,895 | 1/1986 | Glennon | 363/132 |
| 4,574,342 | 3/1986 | Runyan | 363/134 |
| 4,605,999 | 8/1986 | Bowman et al. | 363/19 |
| 4,617,622 | 10/1986 | Fox | 363/132 |
| 4,677,539 | 6/1987 | Erickson et al. | 363/132 |
| 4,730,242 | 3/1988 | Divan | 363/37 |

FOREIGN PATENT DOCUMENTS

| | | | |
|---|---|---|---|
| 1563381 | 4/1970 | Fed. Rep. of Germany | 363/132 |
| 2257264 | 6/1974 | Fed. Rep. of Germany | 363/40 |

OTHER PUBLICATIONS

Skibinski et al, "Characterization of Power Transistors Under Zero Voltage Switching", 1987, IEEE Paper CH2499-2/87/000-0493.
Divan, "Power Converter Topologies for High Performance Motion Control Systems", 1987, CAMF Conf., Jun. 1987.
Divan et al, "Zero Switching Loss Inverters for High Power Applications", 1987, IAS Conf., Oct., 1987.
Schwarz, "A Double-Sided Cycloconverter", pp. 282-291, IEEE Trans. on Ind. Elect. & Contr. Inst., vol. IECI-28, No. 4, Nov. 81.
D. M. Divan, "The Resonant DC Link Converter—A New Concept in Static Power Conversion", IEEE CH2272-3/86/0000-0648, pp. 648-656.
"A DC-AC Power Conversion Technique Using Twin Resonant High-Frequency Links", V. T. Ranganathan & P. D. Ziogas, *IEEE Transactions on Industry Applications*, vol. 1A-19, No. 3, May/Jun. 1983.

*Primary Examiner*—William H. Beha, Jr.
*Attorney, Agent, or Firm*—Antonelli, Terry & Wands

[57] ABSTRACT

An inverter for producing a one or three phase output with neutral is disclosed. An LC resonant circuit is selectively switched by an inverter to produce one or three phases having a fundamental frequency equal to the frequency of each switching circuit within the phases of the inverter. The outputs are filtered to remove higher harmonics to pass the filtered output to the load. Energy is fed back into the resonant circuit by short circulating the switching circuits at the time that the ouput voltage across a switching circuit is zero to minimize switching losses.

8 Claims, 7 Drawing Sheets

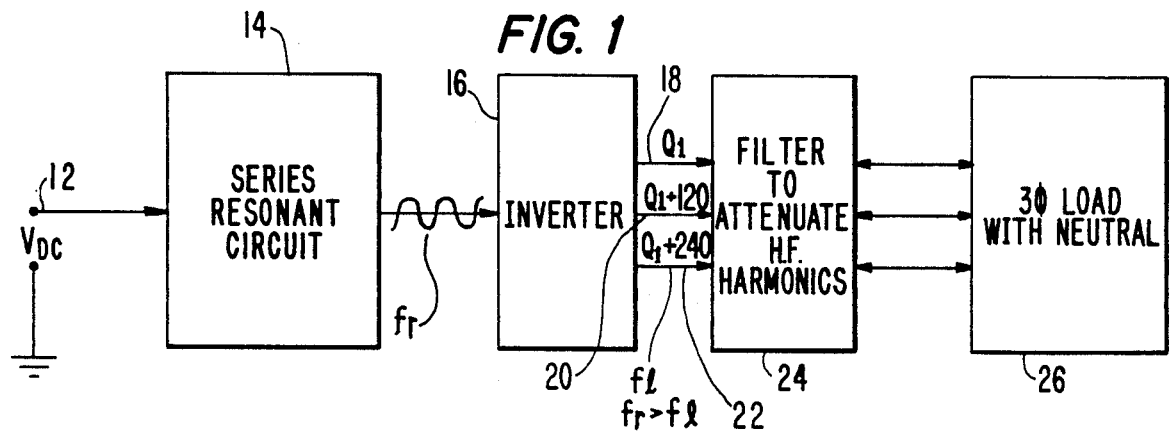
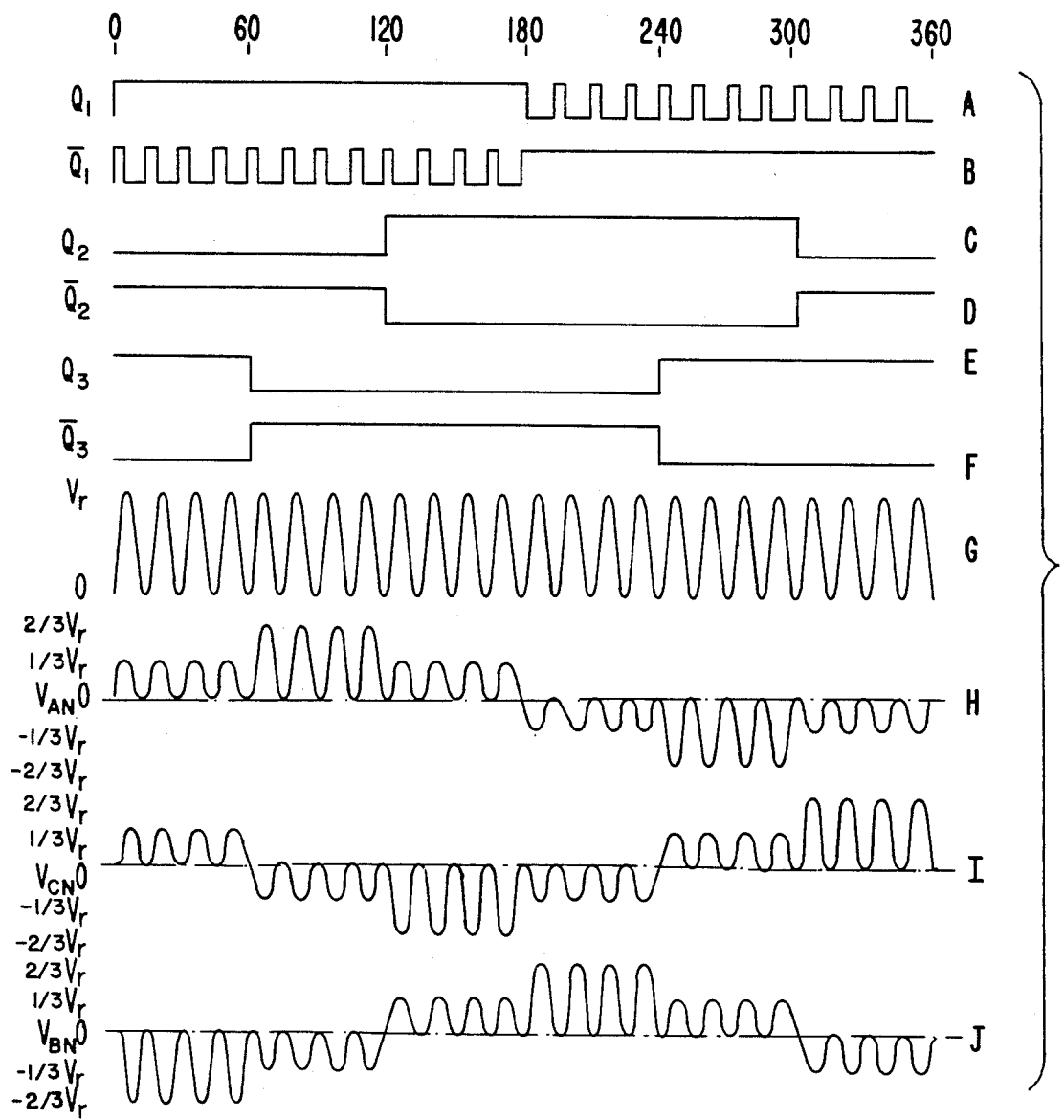

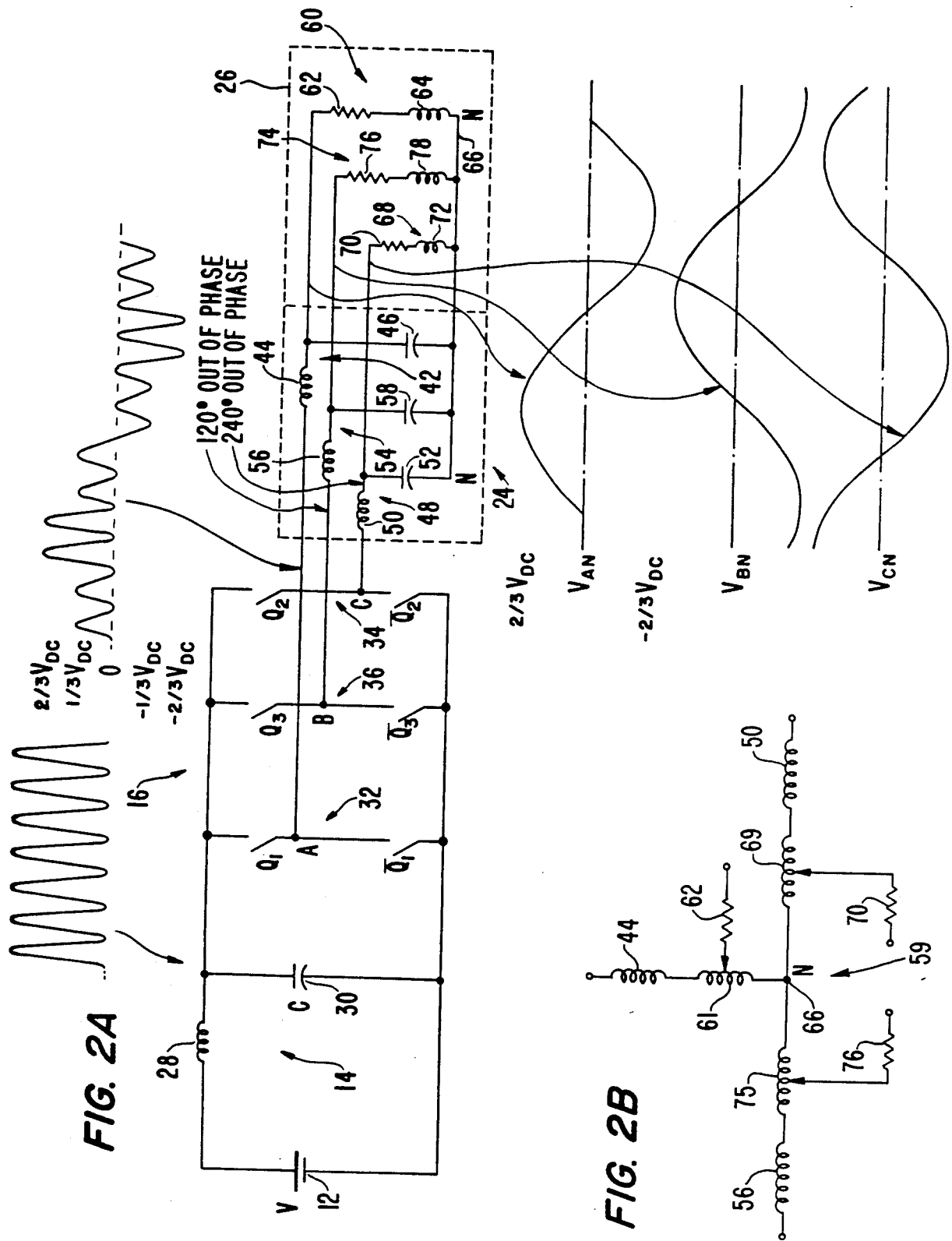

DC TO AC INVERTER WITH NEUTRAL HAVING A RESONANT CIRCUIT

BACKGROUND OF THE INVENTION

1. Field of the Invention

The present invention relates to inverters for converting DC to alternating current with a neutral.

2. Description of the Prior Art

An article entitled "The Resonant DC Link Converter - A New Concept in Static Power Conversion", D. M. DIVAN CH2272-3/86/0000-0648 1986 IEEE discloses a power converter for use with a balanced load such as a motor. Three phase AC at a fundamental frequency without a neutral is generated by selectively switching switches in a switching bridge to create an envelope, varying at the fundamental frequency and containing a resonant frequency higher than the fundamental frequency produced by a parallel resonant circuit, which is applied to the load. Switching losses in the switches are minimized by clamping the DC bus to zero while changing the conductivity of the switches. See column 1, page 650, under the heading "Basic Principles of the Resonant D Link Converter".

An article entitled "A DC-AC Power Conversion Technique Using Twin Resonant High Frequency Links", V. T. Ranganathan, Phoivos D. Ziogas and Victor P. Stefanovic, 0093-9994/83/0500-0393 1983 IEEE discloses the generation of a low frequency by the generation of difference signal from two high frequency sources having frequencies fc+fo and fc−fo. The difference signal is applied to the load by means of selectively switching a switching bridge connected to the electrical load.

A power supply has been developed by Westinghouse Electric Corporation having a switching matrix which chops a DC potential coupled to the switching matrix to create a staircase waveform at a desired fundamental frequency to produce three phase AC. With reference to FIG. 2 of the present invention, the prior art Westinghouse topology has a switching matrix containing switches $Q_1$, $\overline{Q}_1$, $Q_2$, $\overline{Q}_2$, $Q_3$ and $\overline{Q}_3$ and the elements to the right thereof. Unlike the present invention, the potential switched by the switching matrix is DC. Furthermore, as far is known, the pairs of switches $Q_1$ and $\overline{Q}_1$, $Q_2$ and $\overline{Q}_2$ and $Q_3$ and $\overline{Q}_3$ are not short circuited at any point in time as is the case with the present invention as a consequence of the pulses in the last 180° of waveform $Q_1$ of FIG. 3A and the pulses $\overline{Q}_1$ in the first 180° of the waveform $Q_1$ of FIG. 3B. For an unbalanced load, current flows through the load, the neutral, and back to the negative terminal of the DC source.

Inverters are known which convert a DC potential to a single phase and other inverters are known which convert a DC potential to multiple phases. These single phase and multiple phase inverters work on the principal that the DC power source is chopped and filtered to produce a single or three phase output with a neutral.

It is known that switching losses from a transistor may be minimized by switching the transistor state during the time that the voltage across the transistor is zero. See U.S. Pat. Nos. 4,138,715, 4,196,469 and 4,413,313.

Alternating current power supplies are known which utilize a LC resonating circuit for providing a fundamental frequency which have energy fed into the resonating circuit to replace energy drawn off by a load. See U.S. Pat. Nos. 4,196,469 and 4,574,342.

SUMMARY OF THE INVENTION

The present invention provides an improved inverter for converting a DC voltage into three phase AC with a neutral and also for converting a DC voltage into single phase AC with a neutral. The invention has the advantages of having minimal switching losses, low stresses on the switching devices, high efficiency, small energy storage components, and does not require DC bus modulation.

An inverter for producing an output signal with a neutral at a fundamental frequency for connection to a load with a load neutral in accordance with the invention includes a DC power source having a DC potential, an LC circuit, coupled to the DC power source, having a resonant frequency and resonating at the resonant frequency when the DC potential is applied to the LC circuit to cause current flow between the DC power source and the LC circuit, preferably having high Q; a switching circuit coupled to the LC circuit, the switching circuit having a first state permitting current to flow from the LC circuit to the load, and load neutral and a second stat permitting current to flow from the load neutral and load to LC circuit; a zero voltage detector for detecting when a voltage across the switching circuit is zero for producing an output pulse synchronized with each zero voltage point of the resonant frequency and a controller for switching the first and second states at the fundamental frequency to produce an output applied to the load at the fundamental frequency, the fundamental frequency being preferably much lower than the resonant frequency and short circuiting the flow of current from application to the load during the pulses to cause energy to be fed into the LC circuit during the short circuiting of the load. The switching circuit is comprised of first and second switches each having an on state permitting current to flow between two terminals when a control signal is applied to a control terminal, each control signal having a frequency equal to the fundamental frequency and an on interval one-half the period of the fundamental frequency. The switches are in series between first and second terminals of the LC circuit with the first terminal of the LC circuit being a point from which current flows from the LC circuit to the load and the second terminal being a point to which current from the load flows to the LC circuit. A filter is coupled between the switching circuit and the load neutral for attenuating harmonics of the fundamental frequency and the resonant frequency. The filter may be a series LC circuit.

An inverter for producing a single phase output signal at a fundamental frequency for connection to a load with a neutral in accordance with another embodiment of the invention includes a DC power supply for providing a DC potential, a first LC circuit, coupled to the DC power source, having a resonant frequency and resonating at the resonant frequency when the DC potential is applied to the first LC circuit to cause current flow between the DC power source and the first LC circuit; a second LC circuit coupled to the DC power source, having the resonant frequency and resonating at the resonant frequency when the DC potential is applied to the second LC circuit to cause current flow between the DC power source and the second LC circuit; a first switch having a conductivity controlled by a first control signal, coupled to the LC circuit and the load, having a first conductivity state permitting current to flow from the first LC circuit to the load and a second conductivity state blocking current flow to the load; a second switch, having a conductivity controlled by a first control signal, coupled to the second LC circuit and the load, having a first conductivity state permitting current to flow from the second LC circuit to the load and a second conductivity state blocking current flow to the load; and a controller for generating the first and second control signals to cause the first and second conductivity states of the first switch to cyclically vary at the fundamental frequency and to cause the first and second conductivity states of the second switch to cyclically vary at the fundamental frequency with the first and second control signals being 180° out of phase with each other and the fundamental frequency being lower than the resonant frequency. A third switch is coupled between the first and second switches and the first and second LC circuits for short circuiting the flow of current to the load in response to a control pulse; and a zero crossing point detector is provided for detecting when the voltage across a portion of the first or second LC circuits is zero for generating the control pulses synchronous with each zero voltage point. A filter is provided between the first and second switches and the load for attenuating harmonics of the fundamental frequency and the resonant frequency. Moreover, the aforementioned single phase inverter maybe utilized to generate three separate phases by the generation of appropriate timing signals for switching the states of the switches in each of the three phase inverter circuits.

An inverter for producing a three phase output with neutral for connection to a three phase load with load neutral in accordance with another embodiment of the invention includes a DC power source having a DC potential, an LC circuit, coupled to the DC power source, having a resonant frequency and resonating at the resonant frequency when the DC potential is applied to the LC circuit to cause current flow between the DC power source and the LC circuit; a first switching circuit, coupled to the LC circuit, the first switching circuit having a first state permitting current to flow from the LC circuit through the load neutral to a first phase load of the three phase load and a second state permitting current to flow from the load neutral through the first phase load to the LC circuit; a second switching circuit coupled to the LC circuit, the second switching circuit having a first state permitting current to flow from the LC circuit through the load neutral to a second phase load of the three phase load and a second state permitting current to flow from the load neutral to the second phase load to the LC circuit; a third switching circuit coupled to the LC circuit, the third switching circuit having a first state permitting current to flow from the LC circuit through the load neutral to a third phase load of the three phase load and a second state permitting current to flow from the load neutral to the third phase load to the LC circuit; and a controller for controlling the first and second states of the first, second and third switching circuits to produce at a fundamental frequency, lower than the resonant frequency, a first phase output applied to the first phase load of the three phase load, a second phase output at the fundamental frequency applied to the second phase load of the three phase load, and a third phase output at the fundamental frequency applied to the third phase load of the three phase load. Each of the first, second and third switching circuits are each comprised of first and second switches having an on state permitting current to flow between two terminals when a control signal is applied to a control terminal, each control signal having a frequency equal to the fundamental frequency and an on interval one-half the period of the fundamental frequency.

The flow of current to the three phase load is short circuited for a short period of time synchronous with the zero voltage level of the resonant frequency across the first, second and third switching circuits to feed energy into the resonant circuit to replace the energy drawn out by the three phase load. In the preferred embodiment, the feeding of energy into the resonant circuit is produced by a zero crossing point detector which detects when the resonant frequency is at zero voltage across the first, second and third switching circuits and produces a control pulse synchronized with each zero crossing point for switching at least one of the first, second and third switching circuits to short circuit the flow of current from the one or more phases of the three phase load circuit associated with the one or more short circuited switching circuits. In an alternative embodiment of the invention, a fourth switching circuit is coupled in parallel with the first, second and third switching circuits, which is switched into conduction synchronously with the zero voltage intervals of the resonant frequency across the first, second and third switching circuits to feed energy into the LC circuit. At any point in time, two of the three switching circuits are in parallel with each other and the remaining one of the three switching circuits is in series with the parallel combination of the two switching circuits.

Each of the first and second switches of the first, second and third switching circuits are in series to form a series circuit between first and second terminals coupled to the LC circuit, the first terminal of the LC circuit being a point from which current flows from the LC circuit to the three phase load and the second terminal of the LC circuit being a point to which current from the three phase load flows to the LC circuit.

A filter is coupled between the first, second and third switching circuits and the load neutral for attenuating harmonics of the fundamental frequency and the resonant frequency. The filter is a LC circuit which has a low impedance for high harmonics of the fundamental frequency and the resonant frequency.

BRIEF DESCRIPTION OF THE DRAWINGS

FIG. 1 is a block diagram which conceptually illustrates the operation of an inverter for producing a three phase output with neutral in accordance with the present invention.

FIG. 2A illustrates a first embodiment of the present invention and FIG. 2B illustrates the neutral forming circuitry of FIG. 2A in detail.

FIG. 3 is a timing diagram of the operation of the embodiment of FIGS. 2A and B.

DESCRIPTION OF THE PREFERRED EMBODIMENTS

Figure 4:
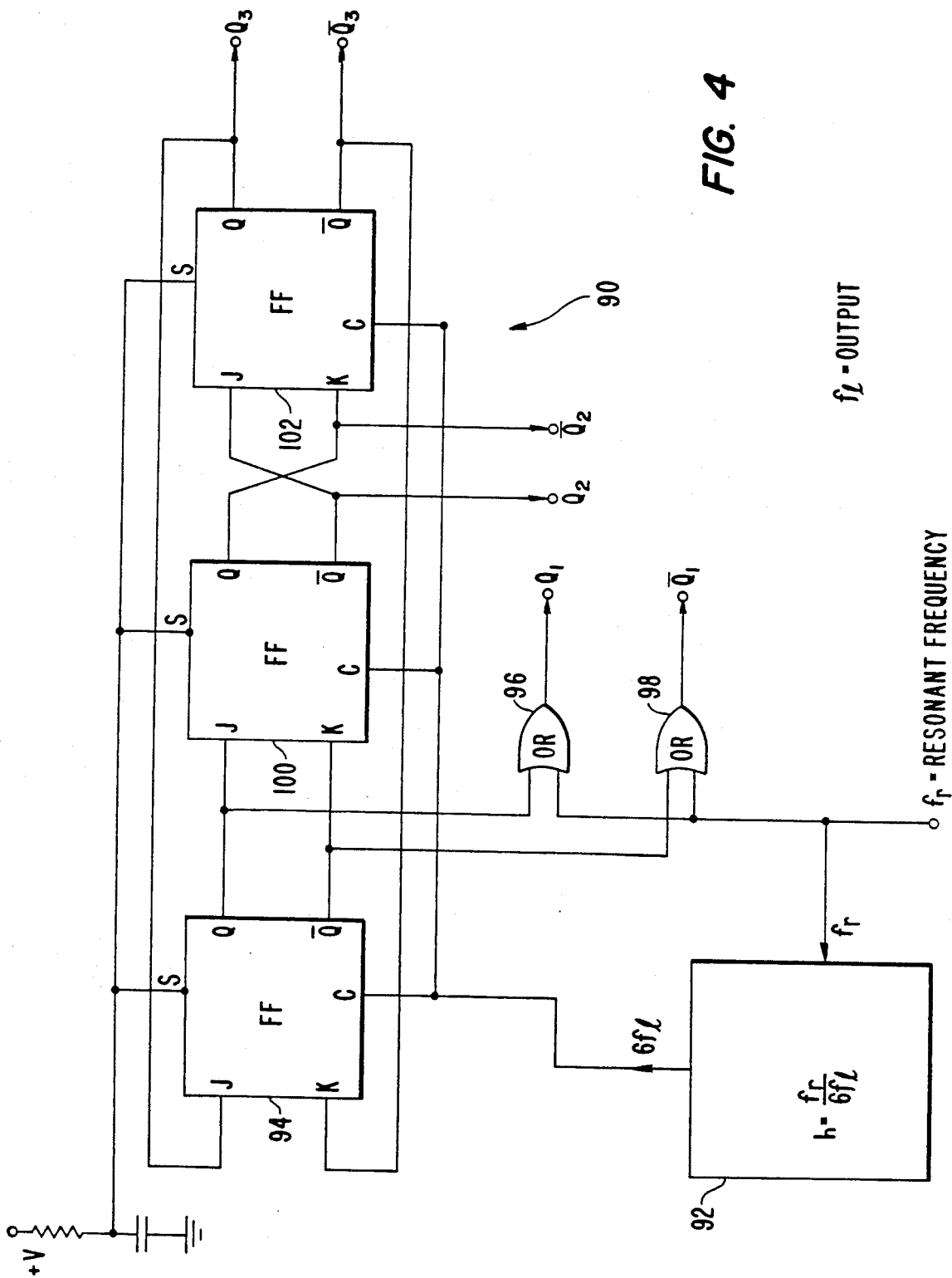
FIG. 4 illustrates a suitable controller for generating the switching signals for the six switches of the embodiment of FIGS. 2A and B.

FIG. 1 illustrates a block diagram illustrating the basic operation of the present invention. A DC power supply 12 applies a voltage $V_{DC}$ to a series resonant circuit 14 to create oscillations at the resonant frequency determined by the LC time constant. A signal $f_r$ is outputted from the series resonant circuit 14 to an inverter 16. The inverter 16 functions to synchronously switch the resonant frequency $f_r$ at a rate equal to a fundamental frequency at which it is desired to generate three phase AC power to create three separate phase outputs 18, 20 and 22 which are respectively phase displaced 120° from each other. The fundamental frequency $f_1$ is much less than $f_r$ and, preferably, the resonant frequency $f_r$ is 100 or more times higher than the fundamental frequency $f_1$ to reduce the weight and size of the resonant LC circuit. Each of the first, second and third phases 18, 20 and 22 are each comprised of six different levels which have a period equal to the period of the frequency $f_1$ and which sequentially vary in terms of the magnitude $V_r$ as measured from the zero degree point of $\frac{1}{3}V_r$, $\frac{2}{3}V_r$, $\frac{1}{3}V_r$, $-\frac{1}{3}V_r$, $-\frac{2}{3}V_r$, and $\frac{1}{3}V_r$. The foregoing fractions of the output of the resonant circuit $V_r$ define a waveform comprised of six separate states each having a constant level. When filtered to remove high harmonics, this waveform produces a sinusoid at the frequency $f_1$. The three phases 18, 20 and 22, are applied to a filter 24 which, as stated above, removes the high frequency harmonics and the frequency $f_r$ to produce a sinusoid waveform at the frequency $f_1$. Given the fact that a Fourier analysis of a cycle of the aforementioned six level waveform reveals that it is comprised of the fundamental frequency, high order odd harmonics of the fundamental frequency and the resonant frequency, it is possible to choose a conventional filter to eliminate the undesired high frequency components. The filtered three phases are applied to a three phase load with neutral 26. The three phase load with neutral 26 may be any three phase load with neutral requiring driving by three phases at the frequency $f_1$.

FIG. 2A illustrates an embodiment of the present invention. Like parts are identified by like reference numerals in FIGS. 1 and 2. It should be understood that this embodiment has three separate phase outputs and load neutral forming circuitry which has been omitted from FIG. 2A for purposes of clarity that is illustrated in detail in FIG. 2B. The series resonant circuit 14 is comprised of an inductor 28 and a capacitor 30 preferably with a Q of at least 10. When the voltage source 12 is connected to the series resonance circuit 14, oscillations commence at the resonant frequency determined by the LC time constant of the series resonant circuit 14. The oscillations at the resonant frequency are as illustrated above the reference numeral 16. The inverter 16 is comprised of a first switching circuit 32, a second switching circuit 34 and a third switching circuit 36 which are each comprised of a pair of series connected switches. The first switching circuit 32 is comprised of switches $Q_1$ and $\overline{Q}_1$; the second switching circuit 34 is comprised of switches $Q_2$ and $\overline{Q}_2$ and the third switching circuit 36 is comprised of switches $Q_3$ and $\overline{Q}_3$. The first, second and third switching circuits 32, 34 and 36 are in parallel with each other and in parallel with the capacitor 30. Each of the 15 switches $Q_1$, $\overline{Q}_1$, $Q_2$, $\overline{Q}_2$, $Q_3$ and $\overline{Q}_3$ is controlled by a control signal which is generated by the control circuit discussed below with reference to FIG. 4. Each of the switches is switched to an on state for 180° of the period of the frequency $f_1$. Switching of the pairs of switches of each of the first, second and third switching circuits 32, 34 and 36 is phase displaced 120° from the switching of the pairs of switches of the other corresponding switching circuits. The first switching circuit 32 has the switch $Q_1$ in an on state for the first 180° of the phase associated with it and the second switch $\overline{Q}_1$ in an on state for the second 180° of the phase associated with it. Similarly, the second switching circuit 34 has the switch $Q_2$ in an on state for the first 180° of the phase associated with it and a second switch $\overline{Q}_2$ is in an on state for the second 180° of the phase associated with it. Finally, the third switching circuit 36 has the switch $Q_3$ in an on state for the first 180° of the phase associated with it and the second switch $\overline{Q}_3$ in an on state for the second 180° of the phase associated with it. Furthermore, as s discussed below, one or more of the switching circuits 32, 34 and 36 are short circuited so that both switches in one or more of the switching circuits are conductive at points at which the voltage across these switches are zero to minimize switching losses.

Section 24 includes filters 42, 48 and 54 which shunt the resonant frequency and high frequency harmonics of the fundamental frequency $f_1$ to the neutral 66. The filters 42, 48 and 54 are each an LC series filter circuit respectively connected between the junction of switches $Q_1$ and $\overline{Q}_1$, between the junction of switches $Q_2$ and $\overline{Q}_2$ and between the junction of switches $Q_3$ and $\overline{Q}_3$ and the neutral 66 of a three phase load 26 to shunt frequency components substantially higher than the fundamental frequency $f_1$ from the load to the neutral. It should be understood that other filters which attenuate high harmonics of the fundamental frequency and the resonant frequency may be used with equal facility. The first phase filter 42 is comprised of inductor 44, which is connected to the junction point of switch $Q_1$ and switch $\overline{Q}_1$ of the first switching circuit 32, and capacitor 46 which is connected to the neutral 66. The second phase filter 48 is comprised of inductor 50, which is connected to the junction point between switches $Q_2$ and $\overline{Q}_2$ of the second switching circuit 34, and capacitor 52 which is connected to the neutral 66. The third phase filter 54 is comprised of inductor 56, which is connected to the junction point between switches $Q_3$ and $\overline{Q}_3$ of the third switching circuit 36, and capacitor 58 which is connected to the neutral 66. The neutral of the power supply is formed by a wye connection as described below with reference to FIG. 2B.

The three phase load 26 may be any three phase load, including an unbalanced three phase load, to be driven by a three phase power supply. As illustrated in FIG. 2A, the first phase load 60 is a series circuit comprised of resistance 62 and inductor 64 which is connected to neutral 66. Similarly, the second phase load 68 is a series circuit comprised of resistance 70 and inductance 72 which is connected to neutral 66. Finally, the third phase load 74 is a series circuit comprised of resistance 76 and inductance 78 connected to neutral 66. It should be understood that each of the three phase loads 60, 68 and 74 may in practice be any load circuit comprised of any combination of resistance, inductance and capacitance including unbalanced loads.

FIG. 2A respectively illustrates the first, second and third phase waveforms $V_{AN}$, $V_{BN}$ and $V_{CN}$ as applied to the first phase load 60, second phase load 68 and third phase load 74. These waveforms are phase displaced 120° from each other as is conventional with three phase power supplies. As will be described in more detail below, the filter circuits substantially attenuate the high frequency harmonics of the frequency $f_1$ and the resonant frequency $f_r$ by shunting them to the neutral to bypass the load. The outputs from the intersection point of each of the switches $Q_1$ and $\overline{Q}_1$ of the first switching circuit 32, $Q_2$ and $\overline{Q}_2$ of the second switching circuit 34, and the $Q_3$ and $\overline{Q}_3$ of the third switching circuit 36 are in the form of a staircase waveform having the fractional magnitudes of the resonant frequency as described above as positive and negative multiples of one third the resonant frequency $f_r$. These waveforms are respectively illustrated in FIGS. 3H-J.

FIG. 2B illustrates the power supply neutral forming circuitry 59 of FIG. 2A. Like reference parts in FIGS. 2A and 2B are identified by like parts. A wye type connection 59 forms the neutral 66 with a three phase autotransformer. It should be understood that other circuits for forming the neutral 66 may also be used. Inductor 44 is connected to autotransformer winding 61 which is connected to the neutral 66. The output of the autotransformer from winding 61 is connected to resistor 62. Inductor 50 is connected to autotransformer winding 69 which is connected to neutral 66. The output of the autotransformer from winding 69 is connected to resistor 70. Inductor 56 is connected to autotransformer winding 75 which is connected to neutral 66. The output of the autotransformer from winding 75 is connected to resistor 76.

In order to maintain a constant amplitude output from the inverter 16, it is necessary to feed energy into the series resonant circuit 14 to replace that consumed by the load. In this embodiment, energy is fed into the series resonant circuit 14 by closing one or more of the switches $Q_1$, $\overline{Q}_1$, $Q_2$, $\overline{Q}_2$, $Q_3$ and $\overline{Q}_3$ during each zero voltage point of the resonant frequency across the capacitor 30 for the 180° of the fundamental frequency $f_1$ while the switch is turned off while one or more of the associated series connected switches is turned on for 180° of the fundamental frequency $f_1$ to create a short circuit across the load 30 which feeds energy into the inductor 28 of the resonant circuit and transfers energy to capacitor 30. A zero crossing detector discussed below, which may be of any conventional design, detects the zero voltage points across capacitor 30 of the resonant circuit 14 and produces a short duration control pulse which is applied to one or more of the switches $Q_1$, $\overline{Q}_1$, $Q_2$, $\overline{Q}_2$, $Q_3$ and $\overline{Q}_3$ to cause closure during the presence of the control pulse while its associated series connected switch is also conductive. Switching of one or more of the switches $Q_1$, $\overline{Q}_1$, $Q_2$, $\overline{Q}_2$, $Q_3$ and $\overline{Q}_3$ is discussed below with respect to FIGS. 3A and B. It should be understood that switching at the zero voltage point is utilized to minimize switching losses.

FIGS. 3A-J are a timing diagram of the operation of the embodiment illustrated in FIGS. 2A and B. FIG. 3A illustrates the state of the switch $Q_1$ of the first switching circuit 32 for a full cycle of the frequency $f_1$. The first 180° represents the high state during which switch $Q_1$ is conductive. The second 180° represents the low state wherein the switch $Q_1$ is not conductive except for the high level pulses which are generated by a zero crossing detector discussed below. At the time that switch $Q_1$ is conductive during the presence of the control pulses in the second 180°, the associated switch $\overline{Q}_1$, as illustrated in FIG. 3B is continually on which permits the flow of current through switches $Q_1$ and $\overline{Q}_1$ of the first switching circuit 32 to feed energy into the inductor 28 of the resonant circuit 14. FIG. 3B illustrates the state of switch $\overline{Q}_1$ of the first switching circuit 32. During the first 180° of operation, the zero crossing detector discussed below applies the control pulses to cause conduction. As is apparent from comparison of FIGS. 3A and 3B during the first 180° of operation, the pulses from the zero crossing detector are applied to switch $\overline{Q}_1$ to cause a short circuit to exist between the capacitor 30 through the closed switches $Q_1$ and $\overline{Q}_1$ of the first switching circuit 32 and during the second 180° of operation a short circuit will exist as a consequence of the control pulses being applied to $Q_1$. It should be understood that the control pulses 80 may be applied to more than one of the pairs of switches $Q_1$, $\overline{Q}_1$, $Q_2$, $\overline{Q}_2$, $Q_3$ and $\overline{Q}_3$ of the first, second and third switching circuits 32, 34 and 36 depending upon the requirements of the amount of energy to be fed into the resonant circuit 14. FIGS. 3C, D, E and F illustrate the switching states of the remaining switches $Q_2$, $\overline{Q}_2$, $Q_3$ and $\overline{Q}_3$ of the second and third switching circuits 34 and 36. The relative phase between the switching states of the first, second and third switching circuits 32, 34 and 36 is that they are phase displaced 120° from each other. Furthermore, the state of each of the switches $Q_1$, $Q_2$, $Q_3$ are phase displaced 180° from the state of the corresponding series connected switch $\overline{Q}_1$, $\overline{Q}_2$, and $\overline{Q}_3$.

The switching sequence illustrated in FIGS. 3A-F, excluding the effect of the control pulses produced by the zero crossing detector discussed below, causes two of the phases of the three phase load circuits 60, 68 and 74 at any time to be in parallel and the remaining one of the three phase loads to be in series with the parallel combination to complete the flow of current from the series resonant circuit 14 through three phase load circuits 60, 68 and 74 and neutral 66 and from the neutral and three phase load circuits back to the series resonant circuit 14. For example, at the 90° point, switches $\overline{Q}_2$ and $\overline{Q}_3$ are closed which causes the second phase load 68 and the third phase load 74 to be in parallel with each other and their parallel combination to be in series with the first phase load 60. In this situation, current flows from the junction point of inductor 28 and capacitor 30 of the resonant circuit 14 through the closed switch $Q_1$ through the first phase load 60 to neutral 66 and back through the parallel combination of the second and third phase loads 68 and 74 through closed switches $\overline{Q}_2$ and $\overline{Q}_3$ to the negative potential of battery 14.

The output of the three switching circuits 32, 34 and 36 prior to filtering is illustrated respectively in FIGS. 3H-J The respective waveforms are phase displaced 120° from each other and are comprised of a staircase waveform having the levels described above which vary as positive and negative multiples of one-third the resonant frequency $V_r$. The staircase waveform is formed by the switching of the high frequency oscillations outputted by the series resonant circuit 14 as illustrated in FIG. 3G in the sequence of FIGS. 3A-F as described above. The switching of the staircase waveform creates the fundamental frequency $f_1$ which is filtered by the first, second and third phase filters 42, 48 and 54 to produce the three phase waveforms illustrated in FIG. 2A while attenuating the higher harmonics of the fundamental frequency and the resonant frequency by shunting them to the neutral.

FIG. 4 illustrates a controller 90 for producing the switching states $Q_1$, $\overline{Q}_1$, $Q_2$, $\overline{Q}_2$, $Q_3$ and $\overline{Q}_3$ illustrated in FIGS. 3A–F. The controller 90 is driven by a pulse source of frequency $f_r$ which is synchronized with the resonant frequency $f_r$. The pulses have a duration equal to the duration of the pulses of FIGS. 3A and B. A clock frequency generator 92 produces an output frequency $6f_1$ wherein $6f_1$ is equal to $f_{r/n}$ wherein n is an integer. A first JK flip-flop 94 produces output states Q and $\overline{Q}$ which are processed by OR gates 96 and 98 to produce the waveforms $Q_1$ and $\overline{Q}_1$ illustrated respectively in FIGS. 3A and 3B. It should be noted that the ORing of the output states from the flip-flop 94 with the frequency $f_r$ produces the switching control states $Q_1$ and $\overline{Q}_1$ which are high for 180° and low for 180° and the series of pulses contained therein for permitting energy to flow into the resonance circuit as discussed above. JK flip-flop 100 has its inputs respectively coupled to the outputs Q and $\overline{Q}$ of JK flip-flop 94. Clocking of flip-flop 100 is at the same rate $6f_1$. The output states Q and $\overline{Q}$ correspond respectively to states $Q_2$ and $\overline{Q}_2$ of FIGS. 3D and C. JK flip-flop 102 has its inputs J and K respectively coupled to the outputs Q2 and $\overline{Q}$2 of flip-flop 100. JK flip-flop 102 is clocked by the frequency $6f_1$ to produce the outputs Q and $\overline{Q}$ corresponding to states $Q_3$ and $\overline{Q}_3$ as illustrated in FIGS. 3E and 3F. The outputs Q and $\overline{Q}$ of the flip-flop 102 are respectively coupled back to the J and K inputs of flip-flop 94 to form a ring.

It should be understood that the combination of the JK flip-flop 94 and OR gates 96 and 98 functions as a digital zero crossing point detector to produce the output pulses respectively illustrated in the first 180° of FIG. 3B and in the second 180° of FIG. 3A. Other known analog or digital zero crossing point detectors could be used in practicing the invention.

Figure 5:
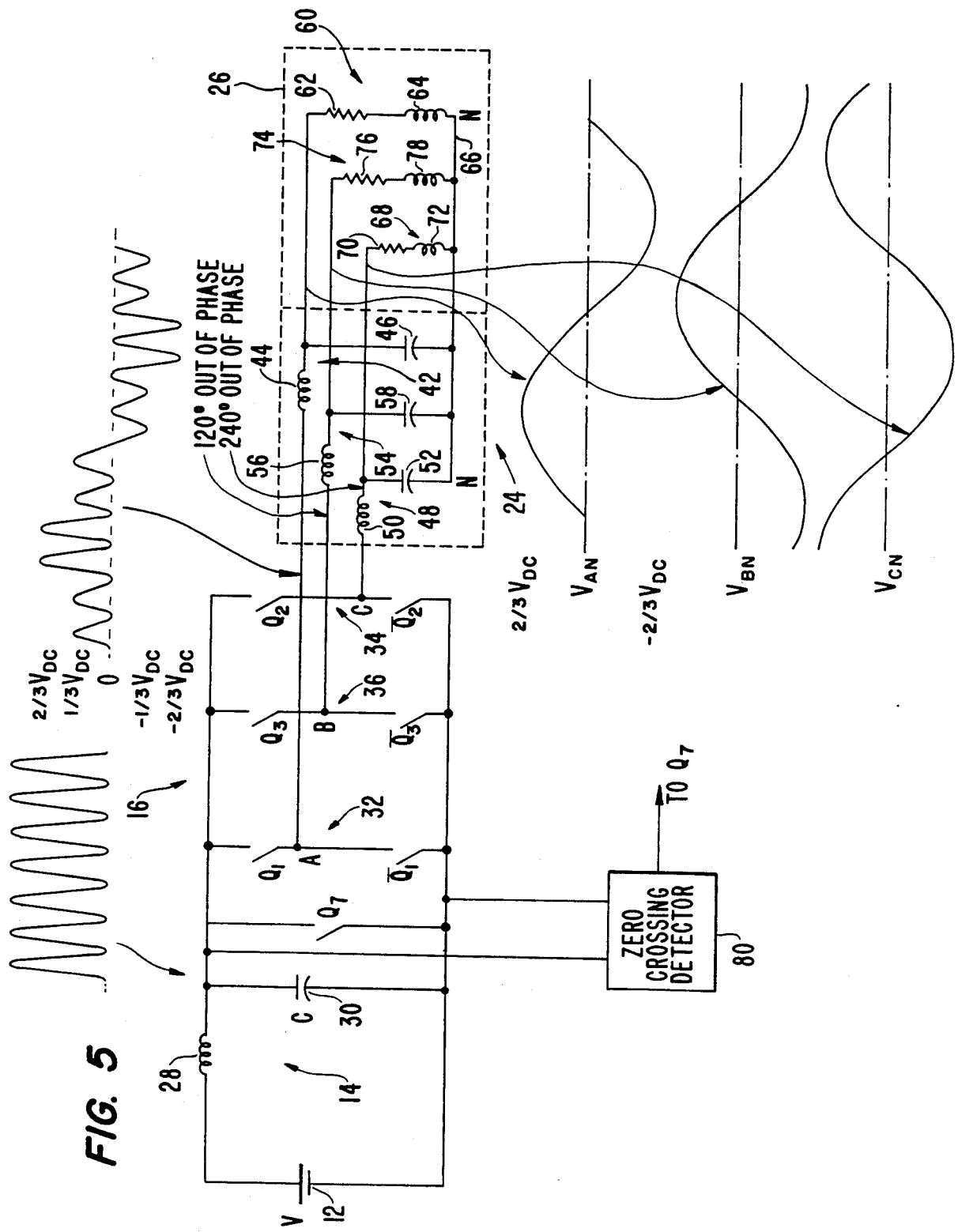
FIG. 5 illustrates an alternative embodiment of the present invention.

FIGS. 5 illustrates a second embodiment of an inverter in accordance with the invention for producing a three phase output with neutral for connection to a three phase load with neutral. Like parts in FIGS. 3 and 5 are identified by like reference numerals. It should further be understood that the embodiment of FIG. 5 contains a neutral forming circuit such as the neutral forming circuit 59 of FIG. 2B. The only difference between the embodiment of FIG. 3 and FIG. 5 is that switch Q7 has been provided to feed energy into the resonant circuit to replace that dissipated by the three phase load 26. A zero crossing point detector 80 of any conventional analog or digital design is provided to detect when the voltage across capacitor 30 of the series resonant circuit 40 is zero to produce control pulses for closing the switch Q7. The control pulses are produced throughout the 360° of the frequency $f_1$ and occur at each zero voltage point and are applied to switch Q7 to cause it to periodically close at the zero voltage points across capacitor 30 to minimize switching losses.

Figure 6:
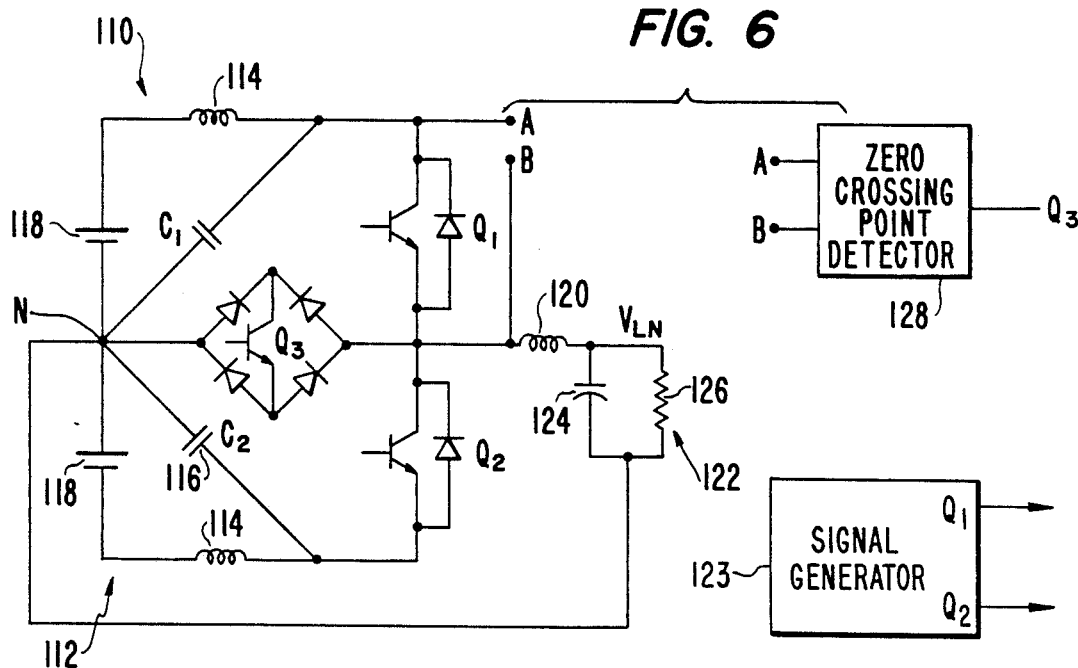
FIG. 6 illustrates an alternative embodiment of an inverter in accordance with the invention for producing a single phase.

FIG. 6 illustrates another embodiment of the present invention which is an inverter with neutral for producing a single phase output. The principal of operation is similar to that of the embodiments of FIGS. 3 and 5 in that a resonant circuit oscillations occurring at a higher frequency are switched at a lower fundamental frequency at which it is desired to produce the single phase output. First and second series resonant circuits 110 and 112 are resonant at a frequency $f_r$ which is higher than the desired output frequency $f_1$. Each resonant circuit 110 and 112 is comprised of an inductor 114 and a capacitor 116. The values of the inductors 114 and the capacitors 116 should be identical to provide the same resonant frequency. A battery 118 provides the energy for powering each resonant circuit. A first switch Q1 when closed couples the output of the resonant circuit 110 to a choke 120 which attenuates harmonics of the output frequency $f_1$ and the resonant frequency $f_r$. The choke 120 functions as a filter to pass only the fundamental frequency $f_1$ in substantially unattenuated form. The choke 120 is connected to load 122 which may be any conventional load. The load as illustrated is comprised of a capacitor 124 and a resistor 126. Similarly, the second resonant circuit 112 is selectively connected the choke 120 when the switch Q2 is conductive. When current is drawn from the resonant circuit 110, it flows through the switch Q1 through the choke 120, load 122 to the neutral and back to the battery 118 and when current is drawn from the resonant circuit 112, it flows through the switch Q2 through choke 120, load 122 to the neutral and back to battery 118. Switch Q3 is provided to permit energy to be fed into the resonant circuits 110 and 112 to sustain the level of oscillation in the same manner as described above in the embodiments of FIGS. 3 and 5. Zero crossing point detector 128 is provided for detecting the zero voltage points across switch Q3 to produce control pulses (FIG. 7C) for switching the switch Q3 into conduction. It should be understood that the zero crossing point detector 128 may be coupled across any one of the capacitors $C_1$, $C_2$ and switches $Q_1$, $Q_2$ and $Q_3$ for the reason that a zero voltage across these elements will occur when the voltage across Q3 is zero which insures minimal switching losses from switching switch $Q_3$.

Figure 7:
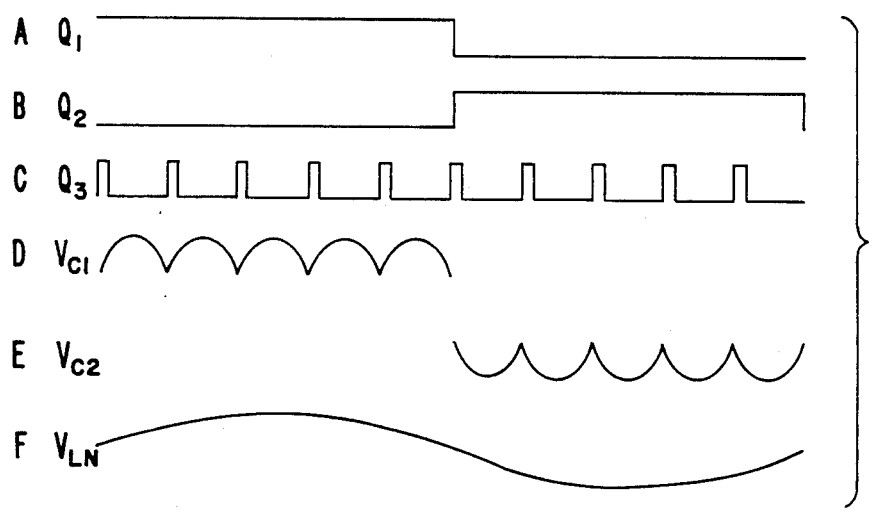
FIG. 7 is a timing diagram illustrating the operation of the embodiment of FIG. 6.

FIGS. 7A–F illustrate the various waveforms present during the operation of the embodiment of FIG. 6. FIG. 7A illustrates the switching states of the transistor Q1 over 360° of a cycle of a basic frequency equal to $f_1$. For the first 180° of the output applied to the load 122, the switch Q1 is conductive causing the application of the waveform as illustrated in FIG. 7D to the choke 120. During the second 180° of the output to the load 122, the switch Q1 is nonconductive. FIG. 7B illustrates the state of switch Q2 which is nonconductive for the first 180° of the output applied to the load 122 and is conductive for the last 180°. A conventional signal generator 123, such as a square wave generator, may be used to generate the signals $Q_1$ and $Q_2$ which have a frequency equal to AC output signal $V_{LN}$ of FIG. 7F. During the second 180° of conduction, switch Q2 applies the waveform of FIG. 7E to the choke 120. FIG. 7C illustrates the switching waveform applied to the switch Q3 to feed energy into the resonant circuits. The zero crossing detector 128 is illustrated as being connected to the resonant circuits 110 and 112 to produce the control pulses of FIG. 7C. However, it should be understood that the zero crossing detector may alternatively be connected across the other elements discussed above. FIG. 7F illustrates the signal applied to the load 122 after filtering by the choke 120. The choke 120 removes the higher harmonics of the fundamental frequency $f_1$ and the resonant frequency $f_r$.

Figure 8A:
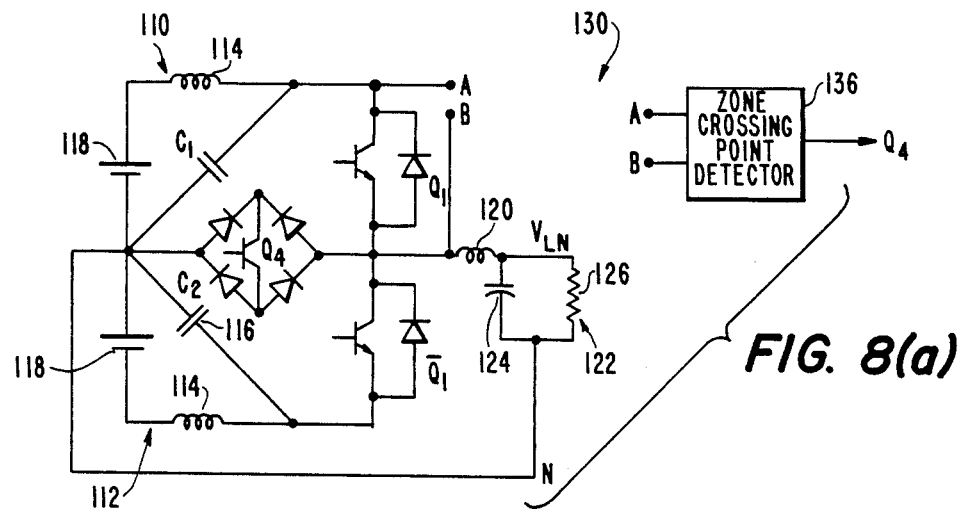
FIGS. 8(a) to 8(c) illustrate another embodiment of the invention which is a modification of the embodiment of FIG. 6 for producing a three phase output with neutral.
Figure 8B:
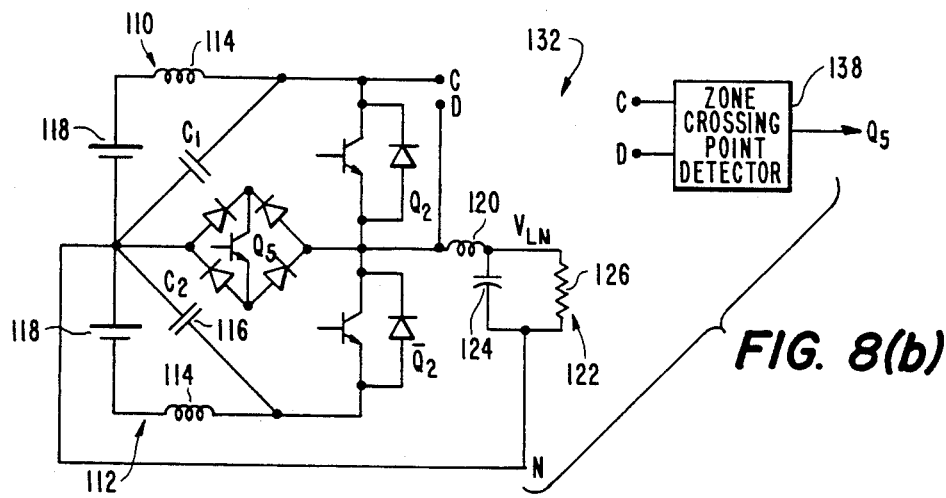
Figure 8C:
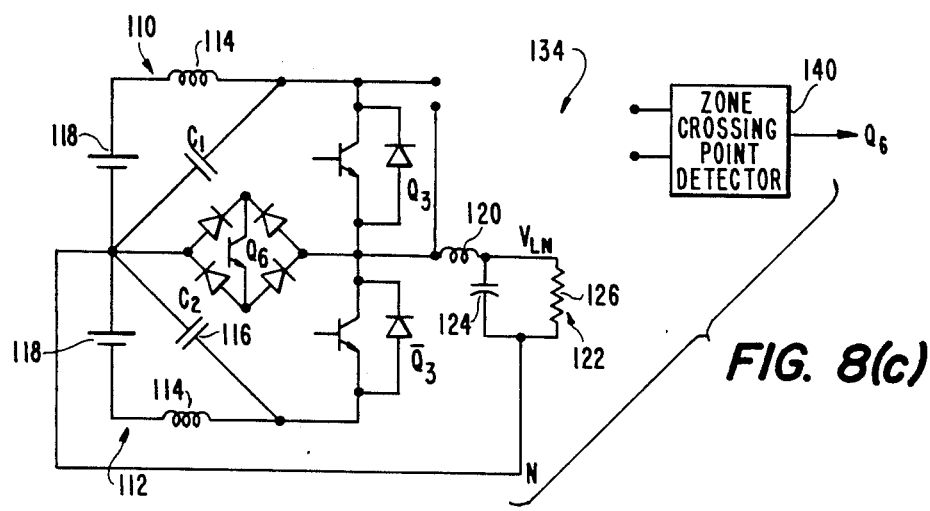

FIG. 8 illustrates a fourth embodiment of the present invention for producing a three phase output with neutral. Each of the phases of the inverter is identical to the single phase inverter of FIG. 6. The first phase generator 130 corresponds in function to the first switching circuit 32 of FIG. 2A. The second phase generator 132 corresponds in function to the second switching circuit 34 of FIG. 2A. The third phase generator 132 corresponds in function to the third switching circuit 36 of FIG. 2A. A zero crossing detector 136 detects the time that the voltage is zero across switch $Q_4$ to generate the switching pulses $Q_4$ to activate the switch $Q_4$ to feed energy into the resonant circuits 110 and 112 of the first generator 130 and minimize switching losses. A zero crossing detector 138 detects the time that the voltage is zero across switch $Q_5$ to generate the switching pulses $Q_5$ to activate switch $Q_5$ to feed energy into the resonant circuits 110 and 112 of the second phase generator 132 and minimize switching losses. A zero crossing detector 140 detects the time that the voltage is zero across switch $Q_6$ to generate the switching pulses $Q_6$ to activate switch $Q_6$ to feed energy into the resonant circuits 110 and 112 of the third phase generator 134 and minimize switching losses.

Figure 9:
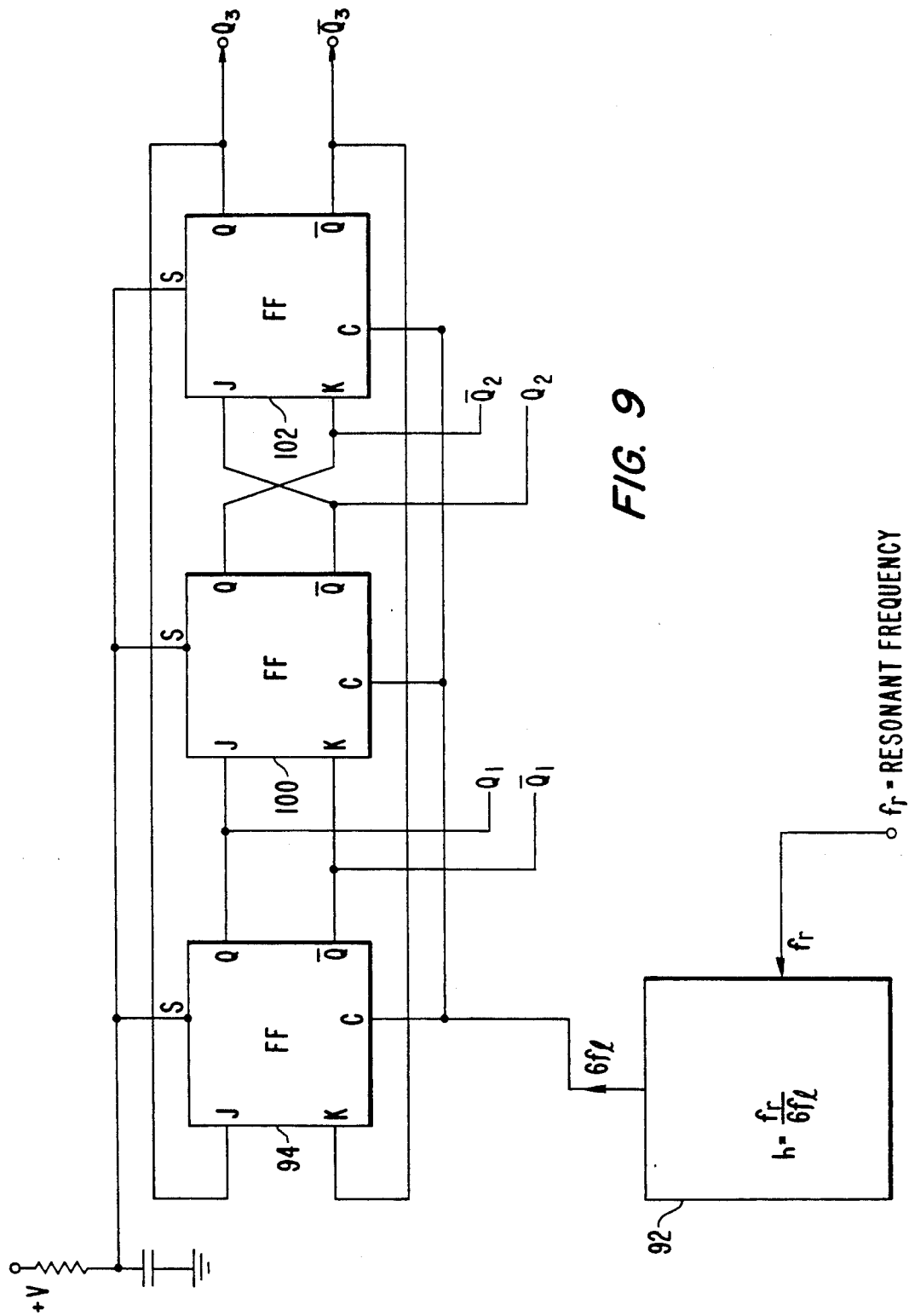
FIG. 9 is a timing diagram illustrating the operation of the embodiment of FIG. 8.

FIG. 9 illustrates a timing circuit for generating the control states of the switches $Q1$, $\overline{Q1}$, $Q2$, $\overline{Q2}$, $Q3$ and $\overline{Q3}$. The operation of the timing circuit of FIG. 9 is identical to FIG. 6 with the exception that OR gates 96 and 98 have been removed.

While the invention has been described in terms of its preferred embodiments, it should be understood that numerous modifications may be made thereto without departing form the spirit and scope of the invention as defined in the appended claims. It is intended that all such modifications fall within the scope of the claims.

We claim:

1. An inverter for producing an output signal at a fundamental frequency for connection to a load with a load neutral comprising:
   (a) a DC power supply means for providing a DC potential;
   (b) a first LC circuit, coupled to the DC power supply means, having a resonant frequency and resonating at the resonant frequency when the DC potential is applied to the first LC circuit to cause current flow between the DC power supply means and the first LC circuit;
   (c) a second LC circuit, coupled to the DC power supply means, having the resonant frequency and resonating at the resonant frequency when the DC potential is applied to the second LC circuit to cause current flow between the DC power supply means and the second LC circuit;
   (d) first switching means having a conductivity controlled by a first control signal, coupled to the first LC circuit and the load, and having a first conductivity state permitting current to flow from the first LC circuit to the load and a second conductivity state blocking current flow to the load;
   (e) second switching means having a conductivity controlled by a second control signal, coupled to the second LC circuit and the load, and having a first conductivity state permitting current to flow from the second LC circuit to the load and a second conductivity state blocking flow to the load; and
   (f) control means for generating the first and second control signals to cause the first and second conductivity states of the first switching means to cyclically vary at a fundamental frequency and to cause the first and second states of the second switching means to cyclically vary at the fundamental frequency with the first and second control signals being 180° out of phase with each other and the fundamental frequency being lower than the resonant frequency.

2. An inverter in accordance with claim 1 further comprising:
   (a) third switching means, coupled between the first and second switching means and the first and second LC circuits, for short circuiting the flow of current to the load in response to a control pulse; and
   (b) zero crossing point detecting means for detecting when the voltage across a portion of the first or second LC circuit is zero for generating the control pulses synchronous with each zero voltage point.

3. An inverter in accordance with claim 1 further comprising:
   filtering means, coupled between the first and second switching means and the load, for attenuating harmonics of the fundamental frequency and the resonant frequency.

4. An inverter in accordance with claim 2 further comprising:
   filtering means, coupled between the first and second switching means and the load, for attenuating harmonics of the fundamental frequency and the resonant frequency.

5. An inverter for producing a three phase output with neutral for connection to a three phase load with load neutral comprising:
   (a) a DC power supply means for providing a DC potential;
   (b) first phase generating means for producing a first phase at the fundamental frequency having a first LC circuit, coupled to the DC power supply means, having a resonant frequency and resonating at the resonant frequency when the DC potential is applied to the first LC circuit to cause current flow between the DC power supply means and the first LC circuit, the fundamental frequency being lower than the resonant frequency, a second LC circuit, coupled to the DC power supply means, having the resonant frequency and resonating at the resonant frequency when the DC potential is applied to the second LC circuit to cause current flow between the DC power supply means and the second LC circuit, first switching means, having a conductivity controlled by a first control signal, coupled to the first LC circuit, having a first conductivity state permitting current to flow from the first LC circuit to a first phase load of the three phase load, and a second conductivity state blocking current flow to the first phase load, second switching means, having a conductivity controlled by a second control signal, coupled to the second LC circuit, having a first conductivity state permitting current to flow from the second LC circuit to the first phase load and a second conductivity state blocking flow to the first phase load;
   (c) a second phase generating means for producing a second phase at the fundamental frequency, phase displaced from the first phase, having a third LC circuit, coupled to the DC power supply means, having the resonant frequency and resonating at the resonant frequency when the DC potential is applied to the second LC circuit to cause current flow between the DC power supply means and the first LC circuit, a second LC circuit, coupled to the DC power supply means, having the resonant frequency and resonating at the resonant frequency when the DC potential is applied to the second LC circuit to cause current flow between the DC power supply means and the second LC circuit, third switching means, having a conductivity controlled by a third control signal, coupled to the third LC circuit, having a first conductivity state permitting current to flow from the third LC circuit to a second phase of the three phase load, and a second conductivity state blocking current flow to the second phase load, fourth switching means, having a conductivity controlled by a fourth control signal coupled to the fourth LC circuit, having a first conductivity state permitting current to flow from the fourth LC circuit to the second phase load and a second conductivity state blocking flow to the second phase load;

(d) a third phase generating means for producing a third phase at the fundamental frequency, phase displaced from the first and second phases, having a fifth LC circuit, coupled to the DC power supply means, having the resonant frequency and resonating at the resonant frequency when the DC potential is applied to the first LC circuit to cause current flow between the DC power supply means and the first LC circuit, a sixth LC circuit, coupled to the DC power supply means, having the resonant frequency and resonating at the resonant frequency when the DC potential is applied to the sixth LC circuit to cause current flow between the DC power supply means and the sixth LC circuit, fifth switching means, having a conductivity controlled by a fifth control signal, coupled to the fifth LC circuit, having a first conductivity state permitting current to flow from the fifth LC circuit to a third phase load of the three phase load, and a second conductivity state blocking current flow to the third phase load, sixth switching means, having a conductivity controlled by a sixth control signal, coupled to the sixth LC circuit, having a first conductivity state permitting current to flow from the sixth LC circuit to the third phase load and a second conductivity state blocking flow to the third phase load; and (e) control means for generating the first, second, third, fourth, fifth and sixth control signal to cause the first and second states of the first switching means to cyclically vary at the fundamental frequency, to cause the first and second states of the second switching means to cyclically vary at the fundamental frequency with the first and second control signals being 180° out of phase with each other, to cause the first and second states of the third switching means to cyclically vary at the fundamental frequency, to cause the first and second states of the fourth switching means to cyclically vary at the fundamental frequency with the third and fourth control signals being 180° out of phase with each other, to cause the first and second states of the fifth switching means to cyclically vary at a fundamental frequency, and to cause the first and second states of the sixth switching means to cyclically vary at the fundamental frequency with the fifth and sixth control signals being 180° out of phase with each other.

6. An inverter in accordance with claim 5 wherein the first control signal, third control signal and fifth control signal are phase displaced 120° from each other.

7. An inverter in accordance with claim 5 further comprising:
 (a) first filtering means, coupled between the first and second switching means and the first phase load for attenuating harmonics of the fundamental frequency and the resonant frequency;
 (b) second filtering means, coupled between the third and fourth switching means and the second phase load, for attenuating harmonics of the fundamental frequency and the resonant frequency; and
 (c) third filtering means, coupled between the fifth and sixth switching means and the third phase load for attenuating harmonics of the fundamental frequency and the resonant frequency.

8. An inverter in accordance with claim 6 further comprising:
 (a) first filtering means, coupled between the first and second switching means and the first phase load, for attenuating harmonics of the fundamental frequency and the resonant frequency;
 (b) second filtering means, coupled between the third and fourth switching means and the second phase load, for attenuating harmonics of the fundamental frequency and the resonant frequency; and
 (c) third filtering means, coupled between the fifth and sixth switching means and the third phase load, for attenuating harmonics and the fundamental frequency and the resonant frequency.

* * * * *